United States Patent [19]
Scott et al.
[11] 3,886,304
[45] May 27, 1975

[54] PHOTOTYPESETTING SYSTEM

[75] Inventors: Howard Mulder Scott, Moorestown; William Frederick Schrotz, Cinnaminson, both of N.J.

[73] Assignee: Information International Inc., Los Angeles, Calif.

[22] Filed: June 14, 1973

[21] Appl. No.: 369,802

[52] U.S. Cl. .................. 178/6.7 R; 95/4.5
[51] Int. Cl. .................. H04n 5/84
[58] Field of Search .................. 340/172.5; 178/6.7 R; 95/4.5; 346/74 CR

[56] References Cited

UNITED STATES PATENTS

| | | | |
|---|---|---|---|
| 3,541,245 | 11/1970 | Wilby | 178/6.7 R |
| 3,609,225 | 9/1971 | Stallard | 178/6.7 X |
| 3,621,214 | 11/1971 | Romney et al | 235/151 |
| 3,679,824 | 7/1972 | Gibson | 178/6.7 R |
| 3,719,776 | 3/1973 | Fujiyasu et al. | 178/6.7 R |

*Primary Examiner*—Gareth D. Shaw
*Assistant Examiner*—Mark Edward Nusbaum
*Attorney, Agent, or Firm*—Lindenberg, Freilich, Wasserman, Rosen & Fernandez

[57] ABSTRACT

An electronic phototypesetting system utilizing a single cathode ray tube (CRT) timeshared as (1) a flying spot scanner and (2) a photo exposure device. In the scan mode, the CRT scans an optical representation of the next character to be displayed by the photo exposure device to develop electronic font digital data signals. The digital data is stored in a single character digital memory and is read out during the exposure mode to display the character on the CRT for imaging onto photosensitive film.

5 Claims, 3 Drawing Figures

PHOTOTYPESETTING SYSTEM

BACKGROUND OF THE INVENTION

1. Field of the Invention

This invention relates generally to electronic phototypesetting systems.

2. Description of the Prior Art

The prior art is replete with electronic phototypesetting systems of varying complexities and capabilities. One such system is shown in U.S. Pat. No. 3,305,841 disclosed Feb. 21, 1967.

Typically, such prior art systems include large storage capacity memories for storing electronic font data. Generally, the font data associated with a particular character is read from the memory, as needed, to cause a cathode ray tube (CRT) to display the character and expose a photosensitve film.

SUMMARY OF THE INVENTION

The present invention is directed to a low cost method and apparatus for phototypesetting in which a single controllable light source, such as a cathode ray tube, is time shared as (1) a flying spot scanner when operating in the scan mode and (2) a photo exposure device when operating in the exposure mode. The system operates alternately in the scan and exposure modes.

During the scan mode, in response to character identification signals, the light spot produced by the CRT scans an optical representation of the identified character to develop font digital data signals. The digital data signals so developed are stored in a small capacity digital memory and during the exposure mode, are read out to cause the CRT to display the identified character. The displayed character is then imaged onto photosensitive film.

In accordance with one aspect of the invention, a mirror is employed to reflect the scan pattern produced by the cathode ray tube during the scan mode onto an optical character storage means. The mirror includes a transparent window through which the displayed character is imaged onto a photosensitive film during the exposure mode.

DESCRIPTION OF THE PREFERRED EMBODIMENTS

Figure 1:
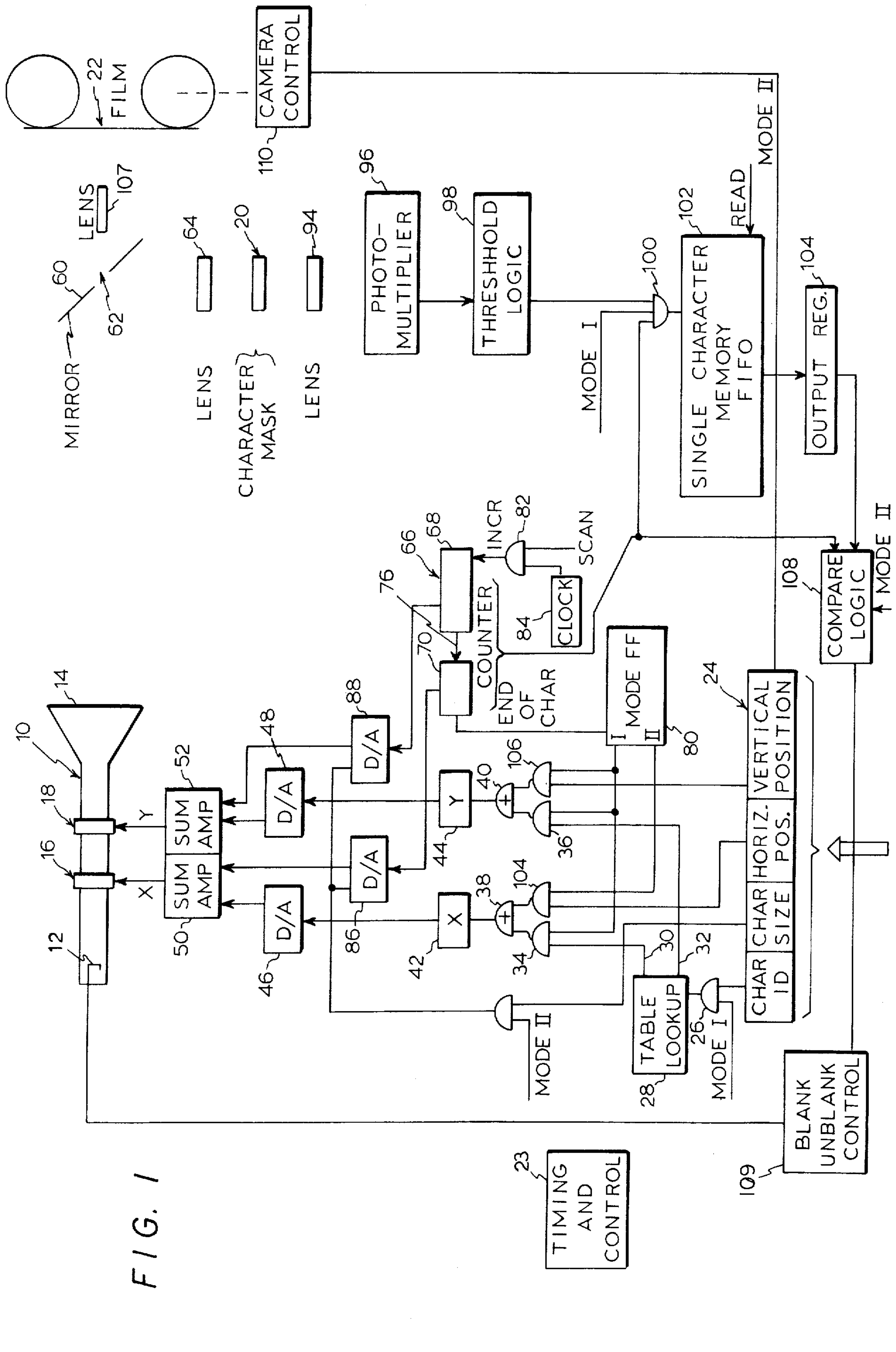
FIG. 1 is a block diagram of a system in accordance with the present invention.

FIG. 1 illustrates a low cost phototypesetting system in accordance with the present invention utilizing a single controllable light source, such as a cathode ray tube (CRT) time shared as both a flying spot scanner and a photoexposure device.

More particularly, the light source in the preferred embodiment of the invention shown in FIG. 1 comprises a conventional cathode ray tube 10 including an electron gun structure 12 for directing an electron beam at a substantially planar target 14 for creating a light spot at the point of impingement. Horizontal and vertical deflection means 16 and 18 are positioned between the electron gun structure 12 and the target 14 for deflecting the electron beam so as to cause it to impinge at any point on the target 14. The amount of deflection of the beam with respect to horizontal and vertical axes is determined by the magnitude of horizontal (X) and vertical (Y) analog deflection signals applied to the deflection means 16 and 18.

Prior to considering in detail the various components of the system shown in FIG. 1, the system operation will be briefly discussed. The system alternately operates in a scan mode and in an exposure mode. In the scan mode, the light spot produced on the target 14 is caused to traverse a selected character on an optical character storage means or font mask 20 in accordance with a predetermined scan pattern to produce digital data signals describing the character shape. These digital data signals are stored in a character memory and are read out during the exposure mode to cause the CRT light spot to display the previously scanned character. The character thus displayed on the target 14 is then imaged onto the film 22. In this manner, character identifying command signals can be successively applied to the system of FIG. 1 to cause the characters to be successively displayed by the CRT and then written onto the film 22.

Figure 3:
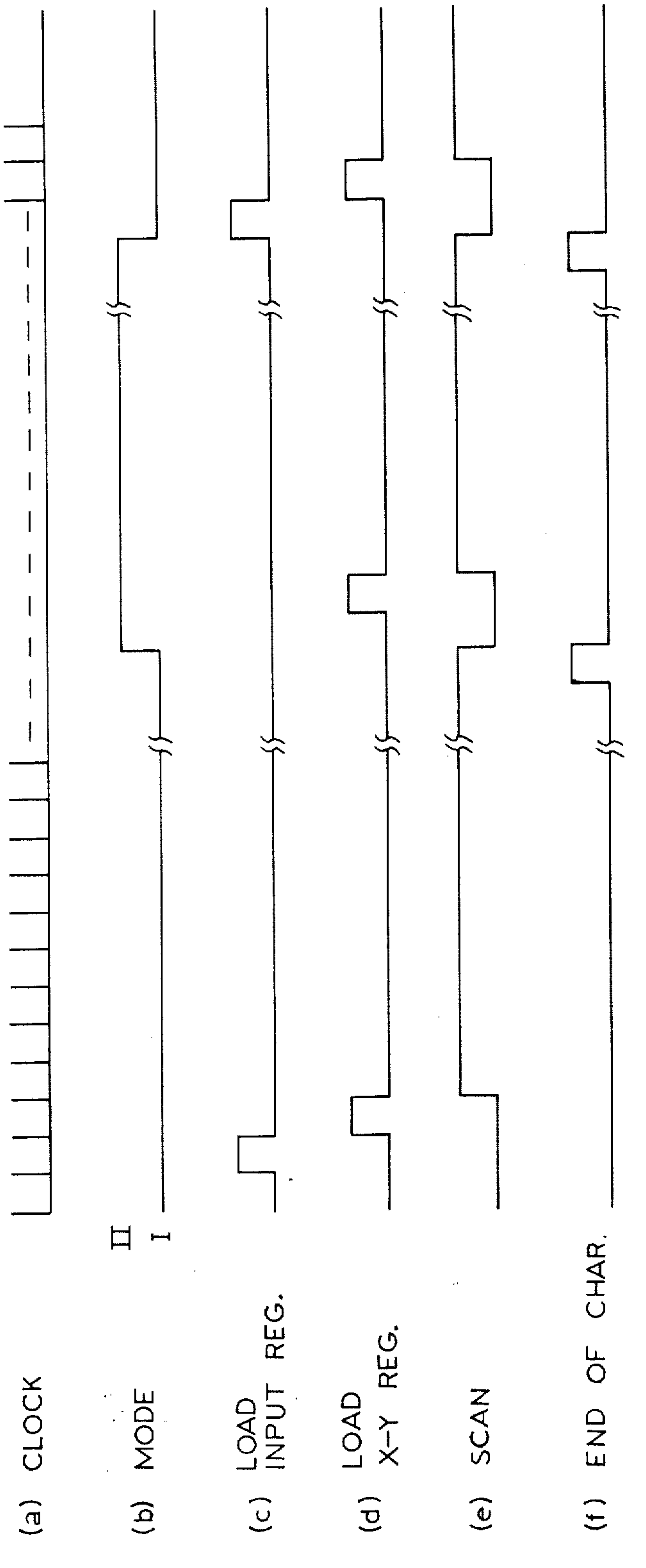
FIG. 3 is a timing diagram showing the relative time occurrence of various control signals employed in the system of FIG. 1.

In FIGS. 1 and 3, the scan mode is referred to as mode I and the exposure mode is referred to as mode II. The mode I and mode II control signals are supplied by the mode flip-flop of FIG. 1, to be discussed hereinafter, and the other timing and control signals of FIG. 3 are supplied by the timing and control means 23 of FIG. 1.

As shown in line (*c*) of the timing diagram of FIG. 3, an operation cycle starts with a control signal "load input register" which causes control data to be entered into the input register 24 illustrated in FIG. 1. The input register 24 is illustrated as including four fields; a character identification (ID) field, a character size field, a horizontal film position field, and a vertical film position field. As should be apparent from the field titles, the control data entered into the character ID fields identifies one of a plurality of characters contained in the character storage means or font mask 20. During mode I, only the character ID field of input register 24 is employed. The character ID field data is applied through AND gate 26 to a table look up or converter means 28 which outputs horizontal and vertical deflection signals corresponding to the position of the identified character in the character storage means.

More particularly, the character storage means 20 in its simplest configuration comprises an optical record containing the shapes of all characters to be displayed. Thus, in one simple configuration, the character storage means 20 can comprise a transparency containing opaque areas corresponding to the character shapes. Preferably, the transparency consists of a matrix of unit character areas with each character area containing a single character pattern. Each character area of course would have a horizontal and vertical position in the matrix. The horizontal and vertical signals provided by the table look up means 28 on output lines 30 and 32 are for the purpose of moving the light spot produced on the cathode ray tube target 14 to a position whereby it is imaged on the character storage means unit character area containing the identified character. Table look up hardware and techniques are well known in the art.

Table look up means 28 may, for example, be of the type disclosed in Gschwind, Hans W. :*Design of Digital Computers*, Springer, Verlag 1967, page 291; or Ledly, Robert S. :*Digital Computer and Control Engineering*, McGraw-Hill 1960, page 121.

The table look up output lines 30 and 32 are respectively coupled to the inputs of AND logic circuits 34 and 36 both of which are enabled during the scan mode. These horizontal and vertical signals are coupled through the OR logic circuits 38 and 40 to horizontal (X) deflection register 42 and vertical (Y) deflection register 44, respectively. The outputs of registers 42 and 44 are coverted to analog signals by digital-to-analog converters 46 and 48 and then applied to sum amplifiers 50 and 52 which respectively drive the horizontal and vertical deflection means 16 and 18 of the cathode ray tube 10. The effect of loading the X and Y registers 42 and 44 with the horizontal and vertical deflection signals provided by the table look up means 28 is to position the light spot produced by the CRT so as to image it on the appropriate character area of the character storage means 20. Positioned adjacent to the target 14 is a mirror 60 having a central transparent window or aperture 62. The mirror 60 reflects the target image downwardly (as shown in FIG. 1) through a first lens 64 to the character storage mask 20. The position of the light spot on the target 14 thus establishes the position of the light spot image on the character mask 20.

Figure 2:
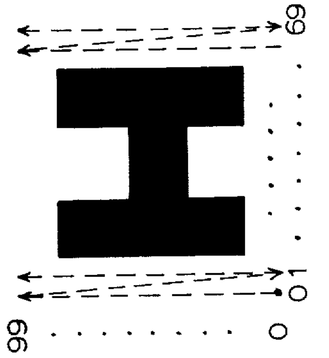
FIG. 2 illustrates a portion of the optical character storage means and depicts the manner in which an optical representation of a character is scanned.

After the light spot has settled at the appropriate position on the target 14, scan signals are generated to move the light spot in accordance with a predetermined raster scan pattern. As represented in FIG. 2, this predetermined scan pattern consists of a plurality of vertical strokes, each horizontally displaced from the previous vertical stroke, extending across the width of the unit character area. As is well known in the art, the ight spot can be caused to scan in this manner by several different means including a sawtooth wave generator. The exemplary technique illustrated in FIG. 1 utilizes a digital scan counter 66. The counter consists of a lower order group of stages 68 and a higher order group of stages 70. Assume, for example only, that it is desired to scan each unit character area with 70 vertical strokes and that it is also desired to be able to resolve 100 separate points on each vertical stroke. In other words, assume that it is desired to examine a unit character area on the character storage means as if it consisted on 100 horizontal rows and 70 vertical columns. Based on this size assumption, the lower order stages 68 of the scan counter 66 comprises a binary scale of 100 counter meaning that 100 distinguishable counts 0–99 are defined during each cycle. At count 99 defined by the counter portion 68, an overflow signal is coupled, via conductor 76 to increment counter portion 70. counter portion 70 is a scale of 70 counter which cyclically defines counts 0–69. At count 69, counter portion 70 provides an overflow signal on conductor 78 which toggles mode flip-flop 80.

After the X and Y registers 42 and 44 have loaded to position the light spot on the target 14 so as to be imaged on the appropriate unit character area on the storage means 20, a scan control signal is generated as shown on line (*e*) of FIG. 3. This scan command signal enables AND circuit 82 to thereby apply pulses from clock source 84 to the increment input terminal of counter portion 68. These clock pulses are represented in line (*a*) of FIG. 3. The pulses provided by AND circuit 82 cause the scan counter 66 to count in the manner aforedescribed.

The digital counts in counter portions 68 and 70 are respectively applied to digital-to-analog converters 86 and 88 which supply analog deflection signals to the previously mentioned sum amplifiers 50 and 52. It should be appreciated that as the count in counter portion 68 increases from 0 toward 99, the light spot will move vertically through the unit character area as represented in FIG. 2. For each cycle of the counter portion 68, the counter portion 70 will be incremented to successively horizontally shift the light spot to thereby describe the scan pattern shown in FIG. 2.

The light spot imaged on the character storage means 20 is focused by lens 94 onto photomultiplier 96. The output of the photomultiplier 96 is coupled to threshold logic 98 which may, for example, be of the type shown in Markus, John :*Sourcebook of Electronic Circuits*, McGraw-Hill 1968, page 32, and which develops an enabling output signal whenever the light spot traverses a change from opaque to transparent or vice versa. The enabling signal developed by threshold logic 98 is coupled to AND circuit 100. The current count of counter 66 is also applied to AND circuit 100. The output of AND circuit 100 is applied to the input of a single character memory which, for simplicity, is illustrated as being of the "first in, first out" (FIFO) type.

By causing the light spot to scan the unit character as represented in FIG. 2, and by storing the digital data representing the position of the light spot (that is, the count in scan counter 66) whenever it traverses a boundary between opaque and transparent, the shape of the character within the scan character area is digitally represented. By subsequently reading the digital counts out of the memory 102 in the same sequence in which they were entered, and by blanking and unblanking the CRT beam as it is describing a scan pattern, the character can be displayed on the CRT target 14. A pattern generator of the aforedescribed type is disclosed in U.S. Pat. No. 3,305,841.

As previously mentioned, in the example assumed, each character area is scanned by 70 vertical lines and the end of the character area scan is represented by the overflow out of the counter portion 70. This is represented in line (*f*) of FIG. 3. The end of character scan toggles the mode flip-flop 80 to thereafter define the exposure mode.

In the exposure mode, the horizontal and vertical position fields of the input register 24 are applied through AND circuits 104 and 106 to the X and Y registers 42 and 44 to position the light spot on the target 14 whereby it will be imaged through the aperture 62 onto the film 22 via lens 107. The loading of the X and Y registers 42 and 44 during the exposure mode is represented in line (*d*) of FIG. 3. Once the registers 42 and 44 have been loaded, incrementing of the scan counter 66 is initiated to cause the CRT light spot to traverse the scan pattern represented in FIG. 2. As this occurs, the scan counts stored in the single character memory 102 are read-out one at a time into the output register 104 in the same sequence that they were read in. A compare logic circuit 108 compares the content of the output register 104 with the current count of the scan counter 66 to control a blank/unblank circuit 109, which is well known in the art and which may, for example, be of the type shown in *Sourcebook of Electronic*

*Circuits*, supra, page 95, and which is connected to the electron gun 12 of the CRT 10. Thus, the scan counts representing the character boundaries stored during the scan mode control the blanking and unblanking during the exposure mode to display the character on the target 14.

It should be recognized that the characters displayed during the exposure mode are all displayed within a small band, preferably a single line of characters, which is imaged through the aperture 62 of the mirror 60 onto the film 22. This band can, for example, correspond to one or a very few lines of type. The film 22 is stepped by the camera control means 110 which may, for example, be of the type shown in U.S. Pat. Nos. 3,305,841; 3,609,225 and 3,679,824, to effect greater line displacements.

The light spot scanning executed during the scan mode is within areas of the target 14 above and below the band used during the exposure mode. The character storage mask 20 is of course arranged in a correspondingly manner so that the portions of the target 14, above and below the central band, used during the scan mode are adequate to image the light spot on all of the unit character areas of the mask 20.

The character size field of the input register 24 is enabled during the exposure mode to control an amplification factor of the digital-to-analog converters 86 and 88. That is, as is well known in the art, in order to produce a double sized character, it is merely necessary to correspondingly increase the analog deflection voltage provided by the converter means 86 and 88 to the amplifiers 50 and 52.

From the foregoing, it should now be recognized that a phototypesetting system has been disclosed herein which employs but a single cathode ray tube time shared to operate in both a scan mode and an exposure mode. During the scan mode, the cathode ray tube functions to scan optical character representations on a character storage mask to produce digital signals describing the character pattern. During the exposure mode, the digital signals are employed to cause the cathode ray tube to display the character pattern which is then imaged onto film. Although a particular type of character generator and a particular scan pattern has been assumed herein, it should be recognized that this is exemplary only and that other character generation techniques can be readily employed in accordance with the present invention.

What is claimed is:

1. An electronic phototypesetting system useful for imaging a character pattern onto photosensitive film said system comprising:

source means for producing a light spot on a substantially planar target;

timing means alternately defining a scan mode and an exposure mode;

character storage means including a plurality of unit character areas each storing the optical pattern of a different one of a set of characters;

means providing character identification signals identifying one of said set of characters and character positioning signals defining the position on said film at which a character pattern is to be imaged;

means active during said scan mode for causing said light spot to trace a predetermined scan pattern;

first imaging means active during said scan mode and responsive to said character identification signals for imaging said light spot trace on the unit character area of said character storage means storing said identified character;

means active during said scan mode and responsive to said light spot tracing said scan pattern on said unit character area for producing digital signals defining the shape of the optical character pattern stored therein;

digital memory means for storing said digital signals;

means active during said exposure mode and responsive to said digital signals for causing said light spot to describe said optical character pattern shape on said planar target; and second imaging means active during said exposure mode and responsive to said character positioning signals for imaging said character pattern described on said target onto the film at a position defined by said character positioning signals.

2. The system of claim 1 wherein said first imaging means includes:

first optical means for imaging said target on said character storage means; and means for producing orthogonal deflection signals for moving said light spot to a position on said target whereby it is imaged by said first optical means on the unit character area storing said identified character.

3. The system of claim 1 wherein said second imaging means includes:

second optical means for imaging said target on said film; and means for producing orthogonal deflection signals for moving said light spot to a position on said target whereby it is imaged on said film at a position defined by said character positioning signals.

4. The system of claim 1 including optical means for imaging a first portion of said target on said character storage means and a second portion of said target on said film; and wherein said first imaging means includes means for producing orthogonal deflection signals for moving said light spot to a position on said target first portion whereby it is imaged by said optical means on the unit character area storing said identified character; and said second imaging means includes means for producing orthogonal deflection signals for moving said light spot to a position on said target second portion whereby it is imaged by said optical means on said film at a position defined by said character positioning signals.

5. The system of claim 4 wherein said optical means includes mirror means defining an aperture therethrough mounted to reflect an image of said target first portion onto said character storage means and pass an image of said target second portion to said film.

* * * * *